(12) United States Patent
Lin et al.

(10) Patent No.: US 8,421,810 B2
(45) Date of Patent: Apr. 16, 2013

(54) LOOK-UP TABLE ON FILM

(75) Inventors: Shu Lin, San Diego, CA (US); Izzat Hekmat Izzat, Santa Clarita, CA (US); Yousef Wasef Nijim, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 698 days.

(21) Appl. No.: 12/450,259

(22) PCT Filed: Mar. 20, 2007

(86) PCT No.: PCT/US2007/006840
§ 371 (c)(1),
(2), (4) Date: Sep. 18, 2009

(87) PCT Pub. No.: WO2008/115181
PCT Pub. Date: Sep. 25, 2008

(65) Prior Publication Data
US 2010/0046833 A1  Feb. 25, 2010

(51) Int. Cl.
*G09G 5/00* (2006.01)
*G09G 5/02* (2006.01)
*G06T 5/00* (2006.01)
*G03F 3/08* (2006.01)
*G06K 9/00* (2006.01)
*G06K 9/40* (2006.01)
*H04N 1/46* (2006.01)

(52) U.S. Cl.
USPC ........... 345/589; 345/600; 345/601; 345/606; 345/643; 358/3.23; 358/3.26; 358/515; 358/523; 358/525; 382/162; 382/164; 382/266; 382/274

(58) Field of Classification Search .................. 345/581, 345/589, 600–601, 606, 611, 612, 619, 643–644, 345/647, 658, 497–498; 348/96, 180; 358/3.01, 358/3.15, 3.26, 3.23, 515–519, 523–525, 358/533, 461, 447–448, 463, 1.9
See application file for complete search history.

(56) References Cited

U.S. PATENT DOCUMENTS

| | | | | | |
|---|---|---|---|---|---|
| 4,969,053 | A | * | 11/1990 | Outa et al. | 348/104 |
| 7,145,597 | B1 | * | 12/2006 | Kinjo | 348/222.1 |
| 2002/0037639 | A1 | * | 3/2002 | Angermann et al. | 438/589 |
| 2002/0080246 | A1 | * | 6/2002 | Parulski | 348/225 |
| 2002/0110372 | A1 | * | 8/2002 | Fields | 396/225 |
| 2002/0118967 | A1 | * | 8/2002 | Funston | 396/155 |
| 2004/0201766 | A1 | * | 10/2004 | Funston et al. | 348/333.02 |
| 2007/0035707 | A1 | | 2/2007 | Margulis | |
| 2007/0040848 | A1 | | 2/2007 | Hutchinson et al. | |
| 2007/0043465 | A1 | * | 2/2007 | Picciotto et al. | 700/121 |
| 2011/0164109 | A1 | * | 7/2011 | Baldridge et al. | 348/43 |
| 2012/0063618 | A1 | * | 3/2012 | Tanaka et al. | 381/303 |
| 2012/0120054 | A1 | * | 5/2012 | Sandrew et al. | 345/419 |

OTHER PUBLICATIONS

International Search Report, Nov. 16, 2007.

* cited by examiner

*Primary Examiner* — Wesner Sajous
(74) *Attorney, Agent, or Firm* — Robert D. Shedd; Richard LaPeruta

(57) ABSTRACT

A color look-up table includes a plurality of images recorded on a film. Each of the images being recorded on a separate picture of the film and containing at least a first level and a second level. The first and second levels having different pixel color values and are arranged to form a detectable geometric pattern on each of the pictures. The first field and a second field having detectable boundaries assigned to characterize distortions on the film.

13 Claims, 4 Drawing Sheets

LOOK-UP TABLE ON FILM

CROSS-REFERENCE TO RELATED APPLICATIONS

This application relates to U.S. application Ser. No. 12/450,258 filed on Sep. 18, 2009 which published as US 2010-0104181A1.

This application claims the benefit, under 35 U.S.C. §365 of International Application PCT/US2007/006840, filed Mar. 20, 2007, which was published in accordance with PCT Article 21(2) on Sep. 25, 2008 in English.

FIELD OF THE INVENTION

The present invention relates to a method for recording a color look-up table on film wherein at least two levels are recorded on each picture of the film, and the levels are recorded such that a detectable geometric pattern is formed. The invention further relates to a method of recording and using the same.

BACKGROUND OF THE INVENTION

In order to be able to restore colors in pictures of a film, a color look-up table is recorded on the film. The color look-up table is typically recorded on the film, for example, in 21 levels. The value of each level is recorded on a picture of the film. After the pictures that contain the color look-up table are scanned, a scanner, computer, or other devices restore the colors of the pictures in the film based on the color look-up table.

The above-described color look-up table, however, has the drawback that when a film is in need of restoration, 21 levels do not provide sufficient resolution to accurately restore the film. Increasing the amount of levels recorded on the film, however, directly increases the amount of space needed on the film to record the color look-up table. Additionally, there is no current method to correct geometric distortions in the film due to film degradation.

It is therefore desirable to provide a color look-up table that can provide sufficient resolution to accurately restore the film without taking-up excessive space on the film. It is further desirable to provide a color look-up table that enables geometric distortion due to film degradation to be detected and corrected.

SUMMARY OF THE INVENTION

The invention provides a film capable of correcting physical distortion comprising at least one of image recorded on a film, each of the at least one images being recorded on a separate picture of the film and containing at least a first field or level and a second field or level having detectable boundaries. The at least one images can be a color look-up table, wherein the first and second levels having different pixel color values.

An embodiment of the invention is a method that includes the steps of providing on film one or more images of a geometric pattern, scanning the images, detecting distortions of the geometric pattern of the images, generating instructions for correcting distortions in the geometric pattern and applying corrections to other images on the film. The method can further comprise building a color look-up table in the images and performing color corrections on the film, wherein the color look-up table on the images contain at least a first color level and a second color level and selecting the first and second color levels to have different values. The first and second color levels can be shaped to form a detectable geometric pattern on each of the images. The generating instructions step can comprise generating an affine transformation to correct deviations in the geometric pattern and the applying corrections step can comprise applying the affine transformation to the other images.

BRIEF DESCRIPTION OF THE DRAWINGS

The invention will now be described by way of example with reference to the accompanying drawings.

DETAILED DESCRIPTION OF THE INVENTION

Figure 1:
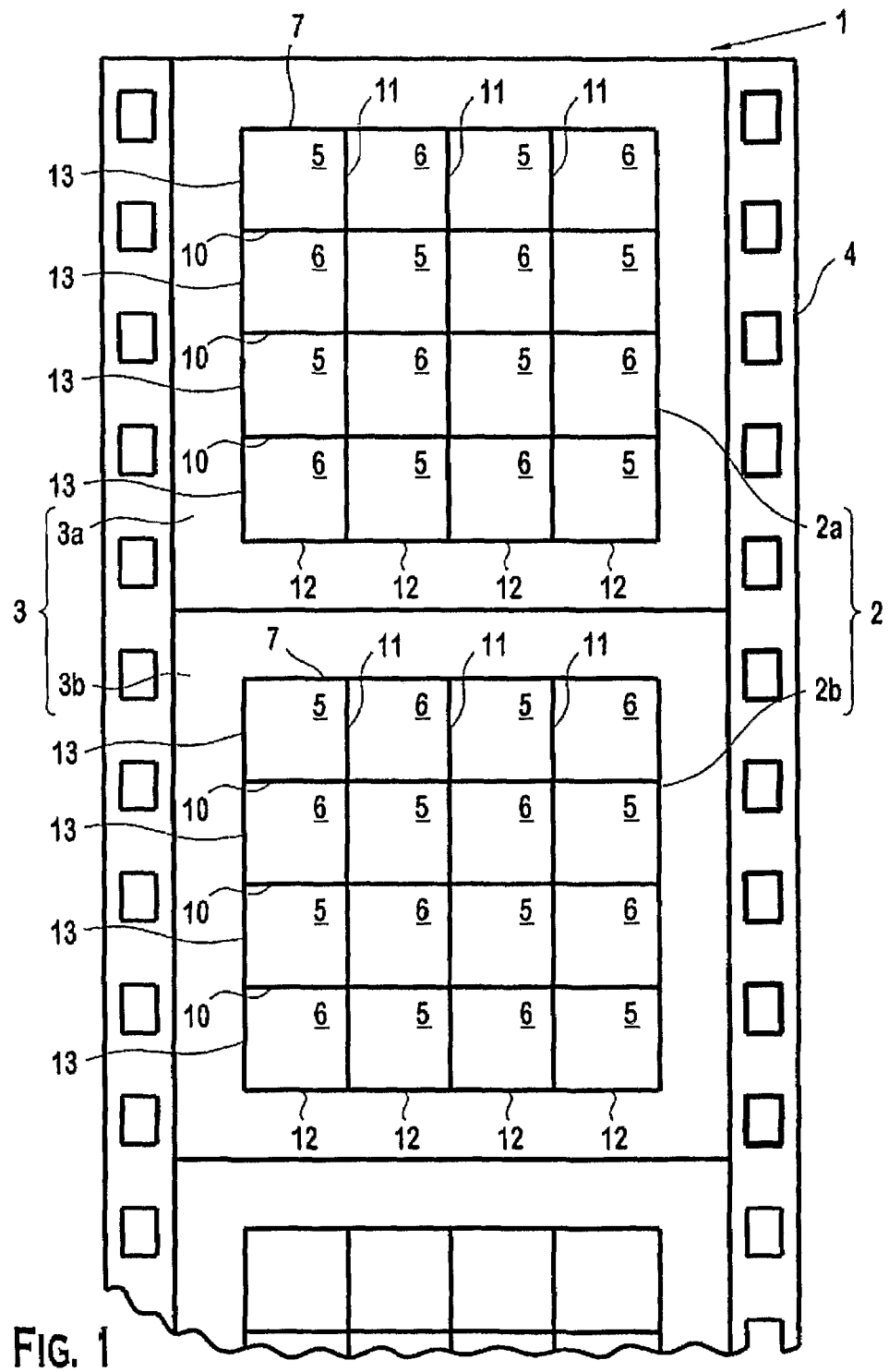
FIG. 1 is a schematic illustration of a color look-up table provided on a reel of film according to the invention.

FIG. 1 shows a color look-up table 1 according to the invention. As shown in FIG. 1, the color look-up table 1 comprises a series of images 2 (or steps) formed over a plurality of pictures 3 (or frames) on a film 4. The color look-up table 1 may be formed, for example, over a plurality of the pictures 3 at a beginning of a reel of the film 4. The color look-up table 1 contains representative pixel information that may be used for restoring colors in the film 4. The color look-up table 1 corresponds to one color component on the film 4, for example, red, green, or blue.

The color look-up table 1 in the film 4 may have 8-bits, 10 bits, 12 bits, or 16 bits to represent a pixel. As shown in Table 1, which is illustrated below, if the film 4 uses 8 bits to represent a pixel, then the color look-up table 1 may have 256 possible pixel color values (which can be referred to as color values, levels or intensities). Table 1 can be the color look-up table for red, green, or blue. (In other words each color has its own look-up table.) If the film 4 uses 10 bits to represent a pixel, then the color look-up table 1 may have 1024 possible pixel color values. It will be appreciated by those skilled in the art, however, that the number of bits used to represent a pixel may vary depending on the desired application of the color look-up table 1.

TABLE 1

True Intensity vs. Level Recorded

| | | | | | | | Level $L_n$ | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 8-bits | 0 | 4 | 8 | 12 | 16 | 20 | 24 | 28 | 32 | 36 | 40 | 44 | 48 | 52 | 56 |
| 10-bits | 0 | 16 | 32 | 48 | 64 | 80 | 96 | 112 | 128 | 144 | 160 | 176 | 192 | 208 | 224 |
| | | | | | | | Level $L_n$ | | | | | | | | |
| | 15 | 16 | 17 | 18 | 19 | 20 | 21 | 22 | 23 | 24 | 25 | 26 | 27 | 28 | 29 |
| 8-bits | 60 | 64 | 68 | 72 | 76 | 80 | 84 | 88 | 92 | 96 | 100 | 104 | 108 | 112 | 116 |
| 10-bits | 240 | 256 | 272 | 288 | 304 | 320 | 336 | 352 | 368 | 384 | 400 | 416 | 432 | 448 | 464 |
| | | | | | | | Level $L_n$ | | | | | | | | |
| | 30 | 31 | 32 | 33 | 34 | 35 | 36 | 37 | 38 | 39 | 40 | 41 | 42 | 43 | 44 |
| 8-bits | 120 | 124 | 128 | 132 | 136 | 140 | 144 | 148 | 152 | 156 | 160 | 164 | 168 | 172 | 176 |
| 10-bits | 480 | 496 | 512 | 528 | 544 | 560 | 576 | 592 | 608 | 624 | 640 | 656 | 672 | 688 | 704 |
| | | | | | | | Level $L_n$ | | | | | | | | |
| | 45 | 46 | 47 | 48 | 49 | 50 | 51 | 52 | 53 | 54 | 55 | 56 | 57 | 58 | 59 |
| 8-bits | 180 | 184 | 188 | 192 | 196 | 200 | 204 | 208 | 212 | 216 | 220 | 224 | 228 | 232 | 236 |
| 10-bits | 720 | 736 | 452 | 468 | 784 | 800 | 816 | 832 | 848 | 864 | 880 | 896 | 912 | 928 | 944 |

| | Level $L_n$ | | | | |
|---|---|---|---|---|---|
| | 60 | 61 | 62 | 63 | 64 |
| 8-bits | 240 | 244 | 248 | 252 | 256 |
| 10-bits | 960 | 976 | 992 | 1008 | 1024 |

The pixel color values are recorded on the film 4 in levels. The more levels that are recorded on the film 4, the greater the resolution of the images reproduced. In Table 1, 65 levels (0-64) are recorded on the film 4. It will be appreciated by those skilled in the art, however, that the number of levels recorded on the film 4 may vary depending on the desired image and the amount of available storage space.

Figure 2:
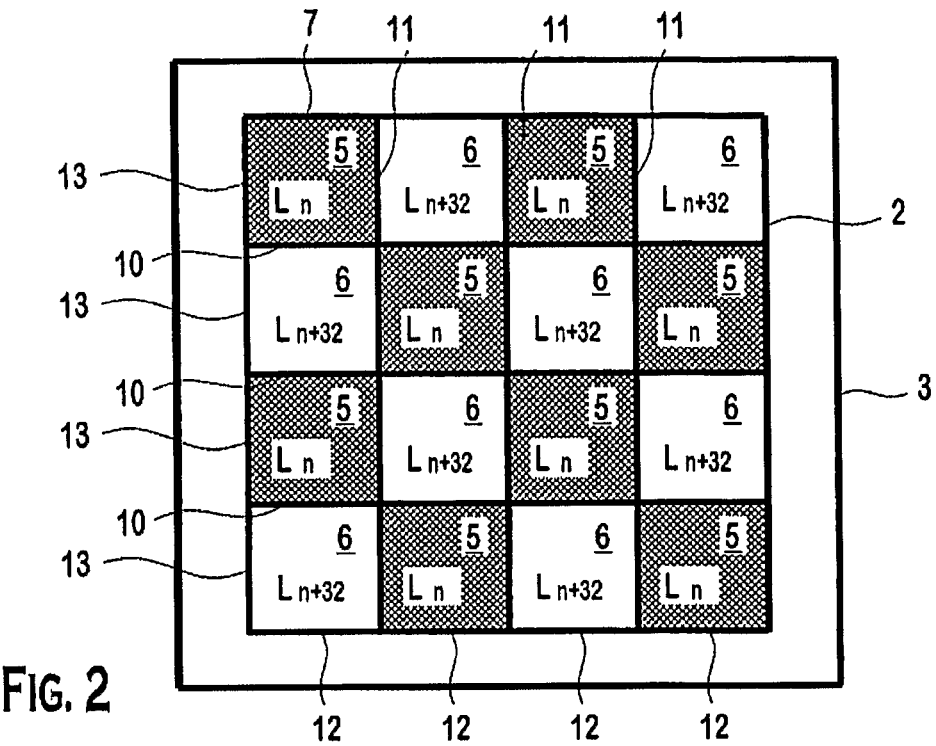
FIG. 2 is a schematic illustration of an image recorded on the color look-up table of FIG. 1.

The configuration of the color look-up table 1 will now be described in greater detail. As shown in FIG. 1, the color look-up table 1 comprises the images 2. As shown in FIG. 2, each of the images 2 contains a first level 5 (or a first intensity level 5) and a second level 6 (or a second intensity level 6). In the illustrated embodiment, the first level 5 is represented by the formula ($L_n$), and the second level 6 is represented by the formula ($L_{n+32}$). The value of n increases with each of the images 2 and is determined by the number of levels that are to be recorded on the film 4. For example, in the illustrated embodiment, the value of n increases with each of the images 2 from 0-32, because 65 levels are recorded on the film 4. The first and second levels 5, 6 are substantially recorded in columns 12 and rows 13. The first and second levels 5, 6 substantially alternate along the columns 12 and the rows 13 such that the first level 5 is positioned next to the second level 6.

Although the images 2 are shown and described herein as each having been recorded with only two of the levels, it will be appreciated by those skilled in the art that either a single level or more than two of the levels may be recorded on each of the images 2 depending on the desired image and the amount of available storage space. Additionally, although the levels are shown and described herein as being formed in four columns and four rows, it will be appreciated by those skilled in the art that the levels may be formed in any number of columns and/or the rows depending on the desired image and the amount of available storage space.

A feature of the invention is that the images 2 containing the first and second levels 5, 6 on the pictures 3, form detectable geometric patterns on each of the pictures 3. (Detectable geometric pattern means that each level 5, 6 is a field having a defined boundary that can be mathematically characterized.) For example, an outer edge of the first and second levels 5, 6 defines a perimeter 7 of the image 2 on the picture 3. Additionally, the color differences between the first and second levels 5, 6 as the first and second levels 5, 6 alternate along the columns 12 and the rows 13 define a plurality of intersecting first cross-bars 10 and second cross-bars 11. In the illustrated embodiment, the first cross-bars 10 extend substantially parallel to each other, and the second cross-bars 11 extend substantially parallel to each other. The first and second cross-bars 10, 11 intersect at an angle of about 90 degrees. The first and second cross-bars 10, 11 intersect the perimeter 7 at an angle of about 90 degrees.

Figure 3:
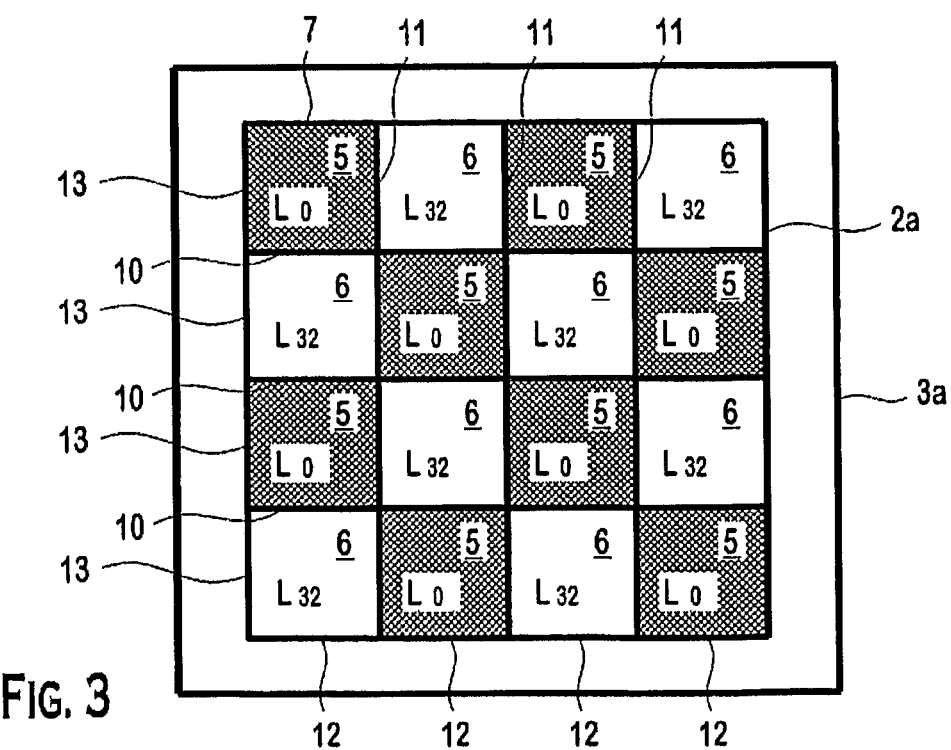
FIG. 3 is a schematic illustration of a first image recorded on the color look-up table of FIG. 1.

A method for providing the color look-up table 1 on the film 4 will now be described in greater detail. As shown in FIG. 1, a first image 2a is recorded on a first picture 3a of the film 4. As shown in FIG. 3, the first image 2a (which can be a first frame on the film) contains the first level 5 and the second level 6. The first level 5 contains pixel color values corresponding to Level 0 ($L_0$), which is the lowest level illustrated in Table 1. The second level 6 contains pixel color values corresponding to Level 32 ($L_{0+32}$ or $L_{32}$), which is the substantially middle level illustrated in Table 1. The first and second levels 5, 6 are recorded in the columns 12 and the rows 13 such that the first and second levels 5, 6 alternate along the columns 12 and the rows 13.

As shown in FIG. 1, a second image 2b is recorded on a second picture 3b of the film 4. The second image 2b contains the first levels 5 and the second levels 6 too. The first level 5 contains pixel color values corresponding to Level 1 ($L_1$), which is one level above the lowest level illustrated in Table 1. The second level 6 contains pixel color values corresponding to Level 33 ($L_{1+32}$ or $L_{33}$), which is one level above the substantially middle value illustrated in Table 1. The first and second levels 5, 6 are recorded in the columns 12 and the rows 13 such that the first and second levels 5, 6 alternate along the columns 12 and the rows 13.

The images 2 are continued to be recorded on the film 4 until all 65 levels are recorded on the film 4. In the illustrated embodiment, the color look-up table 1 can contain 33 of the images 2 wherein each of the images 2 is a step and contains two of the levels shown in Table 1. For example, if the color values are based on 10 bit system, Level 0 ($L_0$) will have a true intensity value of 0 and Level 32 ($L_{0+32}$ or $L_{32}$) will have a true intensity value of 512. The combination of Level 0 ($L_0$) and Level 32 ($L_{0+32}$ or $L_{32}$) can comprise a step 1 or a $1^{st}$ frame on the color look-up table 1 of the film. Level 1 ($L_1$) will have a true intensity value of 16 and Level 33 ($L_{1+32}$ or $L_{33}$) will have a true intensity value of 528. The combination of Level 1 ($L_1$) and Level 33 ($L_{1+32}$ or $L_{33}$) can comprise a step 2 or a $2^{nd}$ frame on the color look-up table 1 of the film. Level 31 ($L_{31}$) will have a true intensity value of 496 and Level 63 ($L_{31+32}$ or $L_{63}$) will have a true intensity value of 1008. The combination of Level 31 ($L_{31}$) and Level 63 ($L_{31+32}$ or $L_{63}$) can comprise a step 32 or a $32^{nd}$ frame on the color look-up table 1 of the film. (Following a final step 33, the following frames or pictures of the film can contain the actual motion pictures images.) An example color look-up table 1 for a system with 65 levels according to the invention is shown in Table 2. In this particular example Level L32 appears twice (i.e., once in step 1 and again in step 33).

TABLE 2

Example Color Look-up Table

| Step No. in Color Table | L(n) = Ln | L(n + 32) = Ln + 32 |
| --- | --- | --- |
| 1 | L(0) | L(32) |
| 2 | L(1) | L(33) |
| 3 | L(2) | L(34) |
| 4 | L(3) | L(35) |
| 5 | L(4) | L(36) |
| 6 | L(5) | L(37) |
| 7 | L(6) | L(38) |
| 8 | L(7) | L(39) |
| 9 | L(8) | L(40) |
| 10 | L(9) | L(41) |
| 11 | L(10) | L(42) |
| 12 | L(11) | L(43) |
| 13 | L(12) | L(44) |
| 14 | L(13) | L(45) |
| 15 | L(14) | L(46) |
| 16 | L(15) | L(47) |
| 17 | L(16) | L(48) |
| 18 | L(17) | L(49) |
| 19 | L(18) | L(50) |
| 20 | L(19) | L(51) |
| 21 | L(20) | L(52) |
| 22 | L(21) | L(53) |
| 23 | L(22) | L(54) |
| 24 | L(23) | L(55) |
| 25 | L(24) | L(56) |
| 26 | L(25) | L(57) |
| 27 | L(26) | L(58) |
| 28 | L(27) | L(59) |
| 29 | L(28) | L(60) |
| 30 | L(29) | L(61) |
| 31 | L(30) | L(62) |
| 32 | L(31) | L(63) |
| 33 | L(32) | L(64) |

It will be appreciated by those skilled in the art that the images 2 may be recorded on the film 4 more than one time to ensure accuracy. Additionally, it will be appreciated by those skilled in the art that the images 2 may be recorded on the film 4 more than one time to record more than one color component on the film 4.

Figure 4:
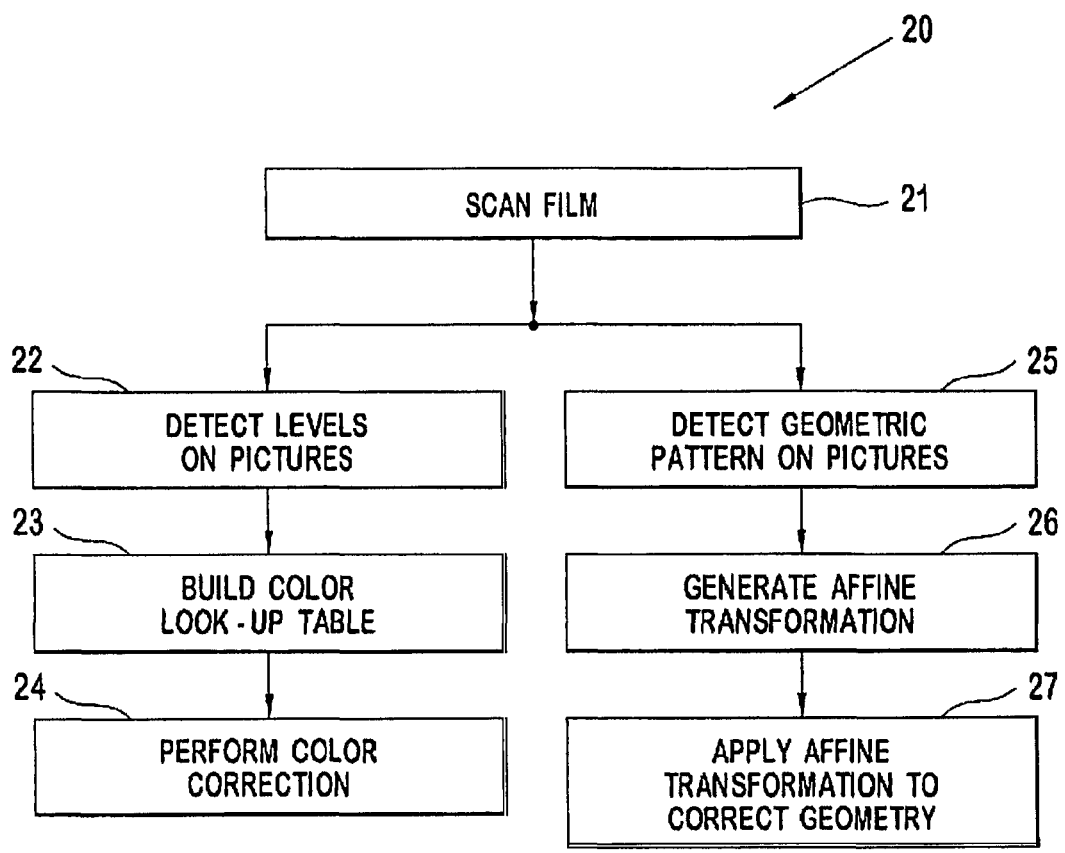
FIG. 4 is a flow chart showing a method of use of the color look-up table of FIG. 1.

A feature of the invention is that the color look-up table is capable of detecting and correcting geometric distortion of the film. A method of using the color look-up table 1 will now be described with reference to the flowchart 20 shown in FIG. 4. As shown in FIG. 4, at process step 21, the entire film 4 including the color look-up table 1 is scanned by a conventional scanning method. At process step 22, as the color look-up table 1 is scanned, a scanner, a computer, or other device detects the first and second levels 5, 6 on the pictures 3. At process step 23, a scanner, a computer, or other device builds a color look-up table on the scanner, computer, or other device. At process step 24, the scanner, computer, or other device makes color corrections in the pictures 3 of the film 4 based on the information retrieved from the color look-up table 1 to restore the film 4, for example, to its original condition. Because the method of scanning the film 4 and making color corrections therein are well known in the art, further description thereof has been omitted.

At process step 25, as the color look-up table 1 is scanned, a scanner, a computer, or other device detects the geometric pattern formed on the pictures 3. For example, in the first picture 3a shown in FIG. 3, the perimeter 7 and the first and second cross-bars 10, 11 of the first image 2a are detected. At points where the first and second cross-bars 10, 11 intersect, a substantially 90 degree angle should be detected indicating that the first and second cross-bars 10, 11 are substantially straight lines. Additionally, at points where the first and second cross-bars 10, 11 intersect the perimeter 7, a substantially 90 degree angle should be detected indicating that the perimeter 7 is formed of substantially straight lines. The detected position of the perimeter 7 and the first and second cross-bars 10, 11 of the images 2 may be represented by at least one equation.

At process step 26, if the perimeter 7 of the images 2 and/or the first and second cross-bars 10, 11 of the images 2 are found not to be substantially straight lines, then an affine transformation is generated to correct deviations in the geometric pattern: At process step 27, the affine transformation is applied to warp content in all of the pictures 3 in the film 4 thereby correcting the geometry of all of the pictures 3 in the film 4. Additionally, interpolation for color pixels not on the integer grip may be made. As a result of this correction, any physical distortion appearing on the film 4 can be removed.

As shown in the flowchart 20, the detection of the first and second levels 5, 6 on the pictures 3 at process step 22 and the detection of the geometric pattern on the pictures 3 at process step 25 may occur simultaneously. The building of the color look-up table at process step 23 and the generation of the affine transformation at process step 26 may also occur simultaneously. Additionally, the color correction at process step 24 and the geometric correction of the content of the pictures 3 in the film 4 at process step 27 may be performed simultaneously. It will be appreciated by those skilled in the art, however, that process steps 22, 23, and 24 may alternatively occur either before or after process steps 25, 26, and 27.

Although the color look-up table 1 shown and described herein is used for color correction and geometry restoration in the restoration of the film 4, it will be appreciated by those skilled in the art that the color look-up table 1 may be used for other purposes and in other applications. For example, the color look-up table 1 may be used in visible picture recording, printing for archiving, etc.

In the color look-up table 1 according to the invention, 65 levels are recorded on the film 4, which enables the color look-up table 1 to support higher resolution images. Additionally, because two levels are recorded in each of the images 2, the color look-up table 1 can be condensed into fewer of the pictures 3 on the film 4. Since the levels alternate with respect to the columns 10 and the rows 11, the images 2 are additionally provided with a geometric construction that enables geometric distortion to be detected and corrected.

Figure 5:
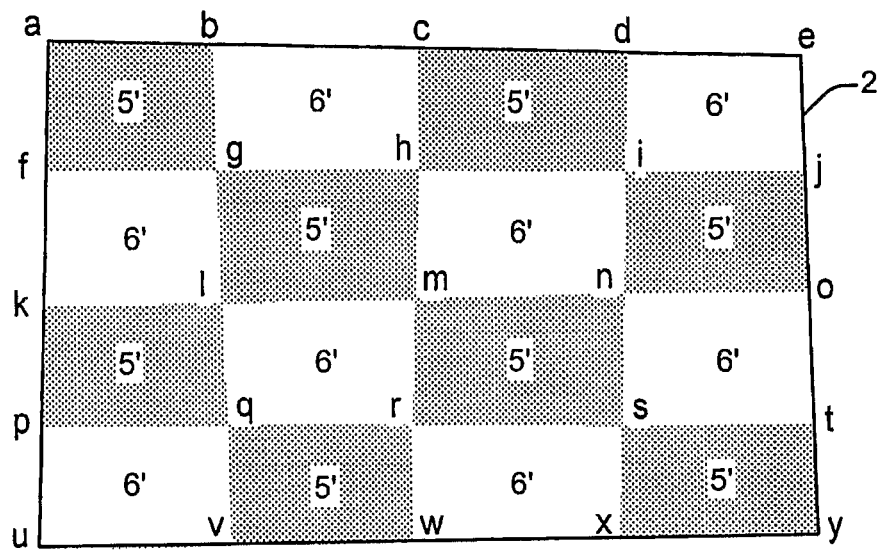
FIG. 5 is an image having distortions prior to correction.
Figure 6:
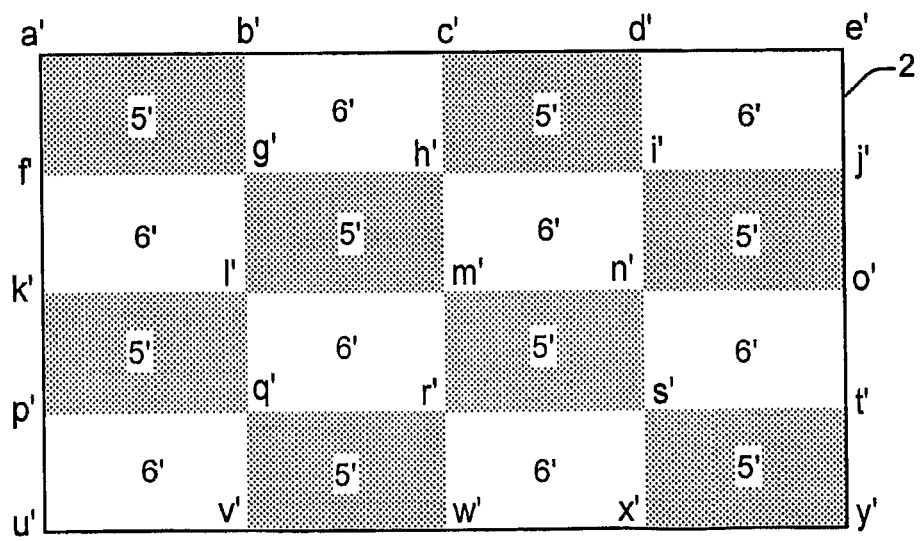
FIG. 6 is the image of FIG. 5 after correction according to the invention.

An important point is that distortions of the frames or pictures of the film containing the color-look-up table 1 and the film having the actual motion pictures images are likely to distort similarly. With this concept in mind, an approach for use of the invention will be described. An image 2 shown in FIG. 5, illustrates the film having distortions which can be visually observed because the borders between the first levels 5 and a second levels 6 are warped. FIG. 6 illustrates how the borders and the first levels 5 and second levels 6 could ideally be shaped or how they may appear after correction. From FIG. 6, one can compute coordinates of each vertex a to y by checking all edges. (The cross point of two edges is a vertex.) The coordinates of each point is $(a_x, a_y), (b_x, b_y), \ldots (y_x, y_y)$. One can then find a transform for each block. For example, block abgf could be characterized as follows:

$$(a_x, a_y) \sim (a'_x, a'_y),$$

$$(b_x, b_y) \sim (b'_x, b'_y),$$

$$(g_x, g_y) \sim (g'_x, g'_y), \text{ and}$$

$$(f_x, f_y) \sim (f'_x, f'_y).$$

The values of x' and y' can be described as follows:

y $$x' = Ax + By + C$$

$$y' = Dx + Ey + F$$

A transform T for these equations can be written as $$T = [A, B, C; D, E, F].$$

This leads to $$A\,a_x + B\,a_y + C = a_x'$$

$$D\,a_x + E\,a_y + F = a_y'$$

$$A\,b_x + B\,b_y + C = b_x'$$

$$D\,b_x + E\,b_y + F = b_y'$$

$$A\,g_x + B\,g_y + C = g_x'$$

$$D\,g_x + E\,g_y + F = g_y'$$

$$A\,f_x + B\,f_y + C = f_x'$$

$$D\,f_x + E\,f_y + F = f_y'$$

With these 8 equations, one can find the 6-parameter affine transform T and implement the transform to appropriately warp each point in the block abgf to a'b'g'f' and get the correct image geometry. The warp determined for these images 2 of the color look-up table can then be used to appropriately warp/shape pictures 3 (or frames) on a film 4 having the motion picture images. With this methodology for correcting distortion in mind, a feature of the invention is that the film has the capability of correcting physical distortion characterized in that at least one of image is recorded on a film; each of these images are recorded on a separate picture of the film; and each of these images contains at least one first field (or level) 5' and at least one second field (or level) 6' having detectable boundaries, wherein the first and second fields do not necessarily have different pixel color values, but may have some other distinguishable attribute (e.g. in texture, polarization, etc.). Essentially, the methodology for this feature of the invention is to use the process steps 21, 25, 26 and 27 described in FIG. 4. It is to be understood that there can be a plurality of first fields and second fields in an image. (These images can be referred to as a look-up table.)

The foregoing illustrates some of the possibilities for practicing the invention. Many other embodiments are possible within the scope and spirit of the invention. For example, although the color look-up table 1 is illustrated as having two levels recorded in each of the images 2, it will be appreciated by those skilled in the art that more than two levels may be recorded in each of the images 2. Additionally, although the color look-up table 1 is illustrated as having a total of 65 levels, it will be appreciated by those skilled in the art that the number of levels may vary depending on the desired application of the color look-up table 1.

It is, therefore, intended that the foregoing description be regarded as illustrative rather than limiting, and that the scope of the invention is given by the appended claims together with their full range of equivalents.

The invention claimed is:

1. A film comprising:
   at least one of image on film;
   each of the at least one images being a separate image and containing at least a first field and a second field having detectable boundaries assigned to characterize distortions on the film, wherein the first field is a first color level and the second field is a second color level, the first and second color levels having different values;
   an outer edge of the at least first and second fields define a perimeter of the image;
   first and second cross-bars separating the first and second fields and intersecting the perimeter; and,
   the at least one image is a color look-up table.

2. The film of claim 1, wherein the first and second fields are arranged in columns and rows, the first and second fields alternating along the columns and rows.

3. A method of recording corrected images comprising the steps of:
   forming on film at least one image of a geometric pattern comprised of columns and rows of fields separated by a plurality of cross bars that intersect a perimeter of the geometric pattern;
   scanning the at least one image;
   detecting distortions of the geometric pattern of the at least one image;
   generating instructions for correcting distortions in the geometric pattern;
   applying corrections to other images on the film, wherein the other images with corrections are recorded on the film.

4. The method of claim 3, wherein the forming step further comprises building a color look-up table in the at least one image and performing color corrections on the film.

5. The method of claim 4, wherein the forming step further comprises building the color look-up table on the at least one image to contain at least a first color level in first fields of the fields and a second color level in second fields of the fields and selecting the first and second color levels to have different values.

6. The method of claim 4, wherein the forming step further comprises shaping the first and second fields of the fields to form a detectable geometric pattern on each of the images.

7. The method of claim 6, wherein the forming step further comprises arranging the first and second fields of the fields in columns and rows and having the first and second fields alternate along the columns and rows.

8. The method of claim 3, wherein the generating instructions step further comprises generating an affine transformation to correct deviations in the geometric pattern.

9. The method of claim 8, wherein the applying corrections step further comprises applying the affine transformation to other images.

10. The method of claim 3, wherein the forming step further comprises building at least a first field of the fields and a second field of the fields having detectable boundaries in to the at least one image.

11. The method of claim 10, wherein the forming step further comprises arranging the first and second fields in the columns and rows and having the first and second fields alternating along the columns and rows.

12. The method of claim 11, wherein the generating instructions step further comprises generating an affine transformation to correct deviations in the geometric pattern.

13. The method of claim 12, wherein the applying corrections step further comprises applying the affine transformation to other images.

* * * * *